(12) United States Patent
Bontrager et al.

(10) Patent No.: US 10,542,223 B2
(45) Date of Patent: Jan. 21, 2020

(54) SYSTEMS, METHODS, AND APPARATUS FOR CAPTURING MULTIPLE VIEWS OF A SUBJECT

(71) Applicant: Twiin Media, LLC, Atlanta, GA (US)

(72) Inventors: Dewayne Bontrager, Atlanta, GA (US); Lawayne Bontrager, Brookhaven, GA (US)

(73) Assignee: Twiin Media, LLC, Atlanta, GA (US)

(*) Notice: Subject to any disclaimer, the term of this patent is extended or adjusted under 35 U.S.C. 154(b) by 0 days.

(21) Appl. No.: 15/192,661

(22) Filed: Jun. 24, 2016

(65) Prior Publication Data

US 2016/0381261 A1   Dec. 29, 2016

Related U.S. Application Data

(60) Provisional application No. 62/185,293, filed on Jun. 26, 2015.

(51) Int. Cl.
*H04N 5/262* (2006.01)
*H04N 5/247* (2006.01)
*H04N 5/225* (2006.01)

(52) U.S. Cl.
CPC .......... *H04N 5/2624* (2013.01); *H04N 5/247* (2013.01); *H04N 5/2256* (2013.01)

(58) Field of Classification Search
CPC .... H04N 5/2624; H04N 5/2253; H04N 5/247; H04N 5/23296; H04N 5/23293; H04N 5/2256; F16M 11/00
See application file for complete search history.

(56) References Cited

U.S. PATENT DOCUMENTS

| | | | | |
|---|---|---|---|---|
| 6,633,328 B1* | 10/2003 | Byrd | ...................... | H04N 7/183 348/143 |
| 7,843,497 B2* | 11/2010 | Conley | .................. | H04N 5/262 348/159 |
| 9,207,518 B2* | 12/2015 | Mueller | ................. | F16M 11/18 |
| 2009/0111670 A1* | 4/2009 | Williams | ........... | A63B 23/0464 482/146 |
| 2010/0118134 A1* | 5/2010 | Maurin | .............. | G01N 21/9508 348/86 |
| 2013/0345546 A1* | 12/2013 | Hobeika | .............. | A61B 6/0457 600/411 |
| 2015/0271414 A1* | 9/2015 | Sato | .................... | H04N 5/23293 348/239 |
| 2016/0065825 A1* | 3/2016 | Kuo | ....................... | H04N 1/212 348/211.11 |

* cited by examiner

*Primary Examiner* — Luong T Nguyen
(74) *Attorney, Agent, or Firm* — Eversheds Sutherland (US) LLP (57) ABSTRACT

Systems, methods, and apparatus for capturing multiple views of a subject are provided by the disclosure. In one example embodiment, a system or apparatus can be mounted above a production set or subject in a scene, such as mounting the system or apparatus to a ceiling of a room. The system or apparatus can include at least 3 cameras mounted to respective vertical rods extending from a central rotatable plate mounted to the ceiling. As the rotatable plate is moved, each of the vertical rods and associated cameras can rotate about the production set or subject in a generally circular shape. When some or all of the 3 cameras are activated, simultaneous images and/or video of the production set or subject in the scene can be captured, wherein some or all of the cameras capture respective simultaneous images or video lacking the other two respective cameras in the scene.

8 Claims, 6 Drawing Sheets

SYSTEMS, METHODS, AND APPARATUS FOR CAPTURING MULTIPLE VIEWS OF A SUBJECT

RELATED APPLICATION

This application claims priority to U.S. Ser. No. 62/185,293, titled "Systems, Methods, and Apparatus for Capturing Multiple Views of a Subject," and filed Jun. 26, 2015, the contents of which are hereby incorporated by reference.

BACKGROUND

When filming a scene for a movie or commercial, a typical film crew may utilize one or more cameras to capture images or video of a subject. For instances involving a single camera, the camera can be moved while capturing images or video of the subject, but the camera can only capture a single perspective from which the camera is located while capturing images or video of the subject. For instances involving multiple cameras, each of the cameras can move independently of each other and capture simultaneous images or video from different perspectives around the subject. In such instances involving multiple cameras, the cameras must be carefully coordinated by location and proximity to avoid capturing images or video of another camera capturing images or video from a different perspective. Extensive and time consuming editing of the captured images and video from multiple cameras can increase filmmakers' production costs.

Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

DETAILED DESCRIPTION

Certain embodiments of the disclosure are directed to systems, methods, and apparatus for capturing multiple views of a subject. In one example embodiment, a system or apparatus can be mounted above a production set or subject in a scene, such as mounting the system or apparatus to a ceiling of a room. The system or apparatus can include at least 3 cameras mounted to respective vertical rods extending from a central rotatable plate mounted to the ceiling. As the rotatable plate is moved, each of the vertical rods and associated cameras can rotate about the production set or subject in a generally circular shape. When some or all of the 3 cameras are activated, simultaneous images and/or video of the production set or subject in the scene can be captured, wherein some or all of the cameras capture respective simultaneous images or video lacking the other two respective cameras in the scene.

The resulting captured images or video from the system or apparatus can be displayed or played back with interesting visual or cinematic effects. For example, in a video or film, the captured images or video from the 3 cameras of the apparatus can be simultaneously displayed in a vertical or horizontal split screen arrangement. Because each of the cameras simultaneously captures a different perspective of the production set or subject in a scene, the playback of the captured video in a vertical or horizontal split screen arrangement can provide a viewer or observer of the captured video with a different perspective of the same production set or subject in the scene. In one instance, a scene with multiple card players playing a game of poker around a table could be captured with the apparatus filming video of the card players playing poker. As the system or apparatus rotates around the players and the table, simultaneous images and/or video can be captured of the players' faces, interactions, conversations, and reactions as the poker game progresses. When the captured video from the 3 cameras is simultaneously played back in a vertical or horizontal split screen arrangement, an interesting cinematic effect can be created, wherein different perspectives of one or more of the players' faces can be simultaneously displayed while the poker game progresses. In this manner, a visually creative and interesting cinematic effect can be generated using the system or apparatus and associated methods of the disclosure.

One or more technical effects of the disclosure can include providing simultaneously captured images and/or video of a production set or subject in a scene. Another technical effect can include avoiding capturing images and/or video of cameras filming the production set or subject. Yet another technical effect can include reducing the video or film production and editing time, and associated costs for a single scene or multiple scenes.

Figure 1:
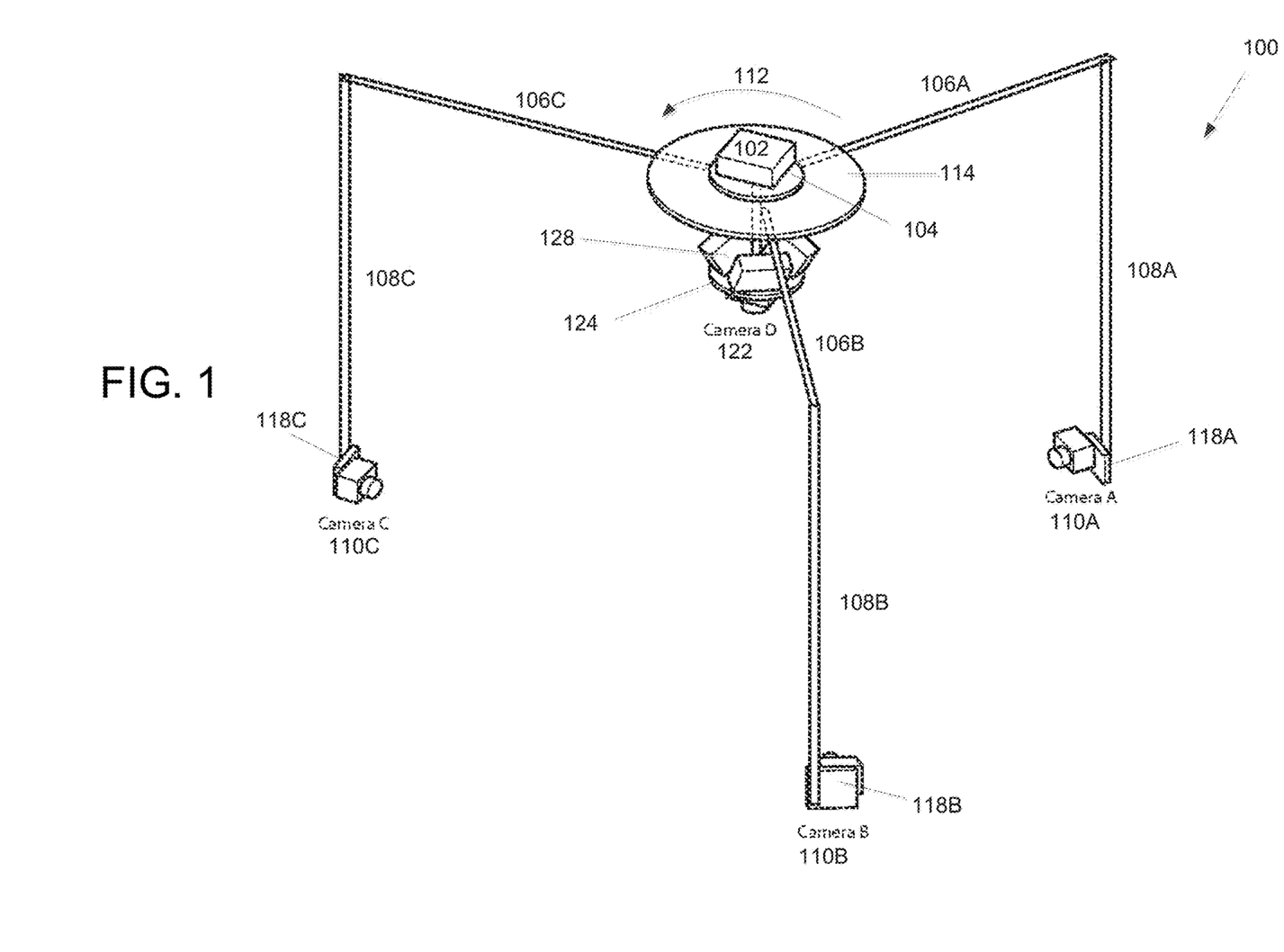
FIG. 1 illustrates a perspective view of an example system and apparatus according to at least one embodiment of the disclosure.
Figure 2:
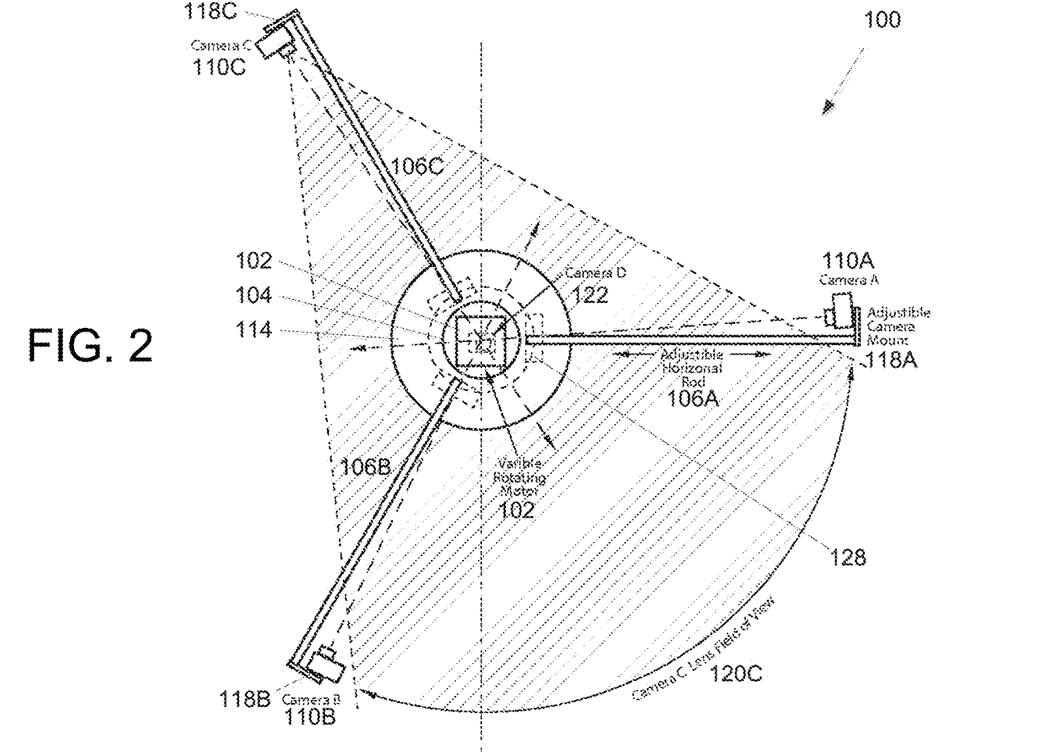
FIG. 2 illustrates an underside view of the example system and apparatus in FIG. 1.
Figure 3:
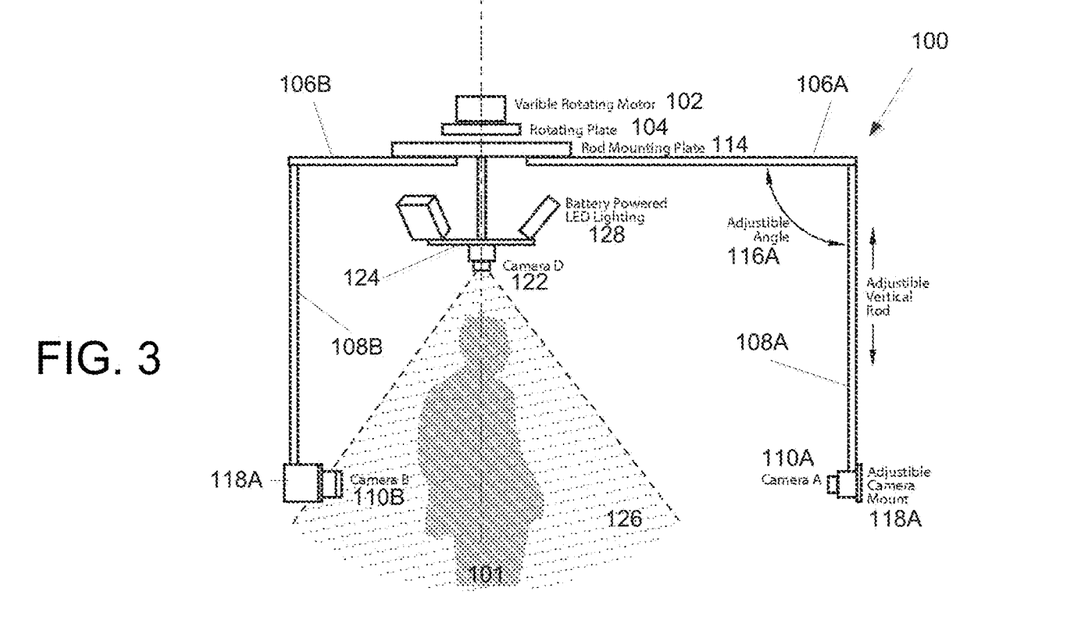
FIG. 3 illustrates a side view of the example system and apparatus in FIG. 1, with respect to a subject positioned adjacent to the system and apparatus.

Turning now to FIG. 1, a perspective view of an example system and apparatus 100 is shown according to at least one embodiment of the disclosure. FIG. 2 shows an underside view of the example system and apparatus 100 shown in FIG. 1, and FIG. 3 shows a side view of the example system and apparatus 100 shown in FIGS. 1 and 2 with respect to a subject 101 positioned beneath the system and apparatus 100. The system and apparatus 100 shown in FIGS. 1-3 can include a motor 102, a rotatable plate 104, a set of horizontal rods 106A-106C, a corresponding set of vertical rods 108A-108C, and a corresponding set of cameras 110A-110C. In one embodiment, the motor 102 and rotatable plate 104 can be mounted to a ceiling fixture, wherein the motor 102 can manipulate the rotatable plate 104 to turn the plate 104 in a generally circular motion 112 with respect to the ceiling fixture. The motor 102 can be, in some instances, a variable rotating motor.

As shown in FIGS. 1-3, an associated rod mounting plate 114 can be mounted to the underside of the rotatable plate 104. In the embodiment shown, the set of horizontal rods 106A-106C can include at least 3 horizontal rods 106A, 106B, 106C spaced apart from each other in a substantially horizontal orientation and mounted to the underside of the rod mounting plate 114. For example, the 3 horizontal rods 106A, 106B, 106C can be spaced apart at approximately 120 degree orientations from each other. In some instances, the horizontal rods 106A, 106B, 106C can be adjustable in length, such as including a series of telescoping rods extending from the rod mounting plate 114. In any instance, each of the horizontal rods 106A, 106B, 106C can be generally extended to the same or similar length or distance from the rod mounting plate 114. The horizontal rods 106A, 106B, 106C can include a first end, second or opposing end, and a middle section. In other embodiments, more than 3 horizontal rods can be used with a system or apparatus 100.

Also shown in the embodiment of FIGS. 1-3, the corresponding set of vertical rods 108A-108C can include at least 3 vertical rods 108A, 108B, 108C, each of which can be respectively mounted adjacent to an extended opposing end of the horizontal rods 106A, 106B, 106C, wherein each of the vertical rods 108A, 108B, 108C extends substantially vertically from a corresponding respective horizontal rod 106A, 106B, 106C. For example, one end of each of the 3 vertical rods, such as 108A, can be mounted to a respective extended opposing end of a corresponding horizontal rod, such as 106A. In some instances, the vertical rods 108A, 108B, 108C can be adjustable in length, such as including a series of telescoping rods extending from the opposing end of the respective horizontal rods 106A, 106B, 106C. In any instance, each of the vertical rods 108A, 108B, 108C can be generally extended to the same or similar length or distance from the respective horizontal rods 106A, 106B, 106C. The vertical rods 108A, 108B, 108C can include a first end, second or opposing end, and a middle section. In other embodiments, more than 3 vertical rods can be used with a system or apparatus 100.

In some embodiments, the angle, such as 116A, between the horizontal rods and the corresponding respective vertical rods can be adjusted. For example, in some instances, the angle, such as 116A, will be about 90 degrees between the horizontal rods, such as 106A, and the corresponding respective vertical rods, such as 108A. In other instances, the angle, such as 116A, can be adjusted between 0 and 90 degrees between the horizontal rods, such as 106A, and the corresponding respective vertical rods, such as 108A. In other instances, the angle, such as 116A, can be adjusted between 91 and 180 degrees between the horizontal rods, such as 106A, and the corresponding respective vertical rods, such as 108A. In any instance, the angle, such as 116A, between the horizontal rods, such as 106A, and the corresponding respective vertical rods, such as 108A, can be manually or automatically adjusted. For example, remotely controlled actuating devices can be used to change some or all of the angles, such as 116A between the horizontal rods, such as 106A, and the corresponding respective vertical rods, such as 108A, while the system or apparatus 100 is either stationary or rotating. In this manner, the visually creative and interesting cinematic effects of the disclosure can be enhanced when the mounted cameras, such as 110A-110C, are moved inward or outward from the production set or subject 101.

Further shown in the embodiment of FIGS. 1-3, each of the vertical rods 108A-108C can include a respective camera mount 118A-118C or bracket operable to position a respective camera 110A-110C with respect to each of the vertical rods 108A-108C. That is, for example, a vertical rod, such as 108A, can include a camera mount, such as 118A, operable to position a camera, such as 110A, with respect to the vertical rod, such as 108A. Each of the camera mounts 118A-118C or brackets can be mounted adjacent to an extended or opposing end of a respective vertical rod 108A-108C. In some instances, the camera mounts 118A-118C or brackets can be adjustable to mount different sized or types of cameras. In any instance, each of the camera mounts 118A-118C or brackets is operable to position a respective camera 110A-110C to permit the camera, when mounted to the vertical rod 108A-108C, to capture images and/or video when mounted to the vertical rod 108A-108C.

Typically, when each of the cameras 110A-110C is mounted to a respective camera mount 118A-118C or bracket, some or all of the cameras 110A-110C can be positioned to simultaneously capture images and/or video of the same production set or subject 101 positioned immediately beneath the motor 102, rotatable plate 104, and/or set of horizontal rods 106A-106C, and within the set of vertical rods 108A-108C. In certain embodiments, some or all of the cameras 110A-110C can be positioned wherein the cameras 110A-110C can capture respective simultaneous images and/or video lacking the other respective cameras. For example, as shown in FIG. 2, when 3 cameras, such as 110A-110C, are mounted to respective camera mounts, such as 118A-118C, or brackets on corresponding vertical rods, such as 108A-108C, each of the cameras can be positioned wherein each camera's lens field of view extends approximately between the two other vertical rods, such that the lens field of view excludes the corresponding cameras and camera mounts or brackets on the two other vertical rods. In other words, a first camera, such as 110C, mounted to a first camera mount, such as 118C, on a first vertical rod, such as 108C, can be positioned wherein the first camera's lens field of view, such as 120C, extends between a second vertical rod, such as 108A, and a third vertical rod, such as 108B, such that the first camera's lens field of view, such as 120C, excludes a second camera, such as 110A, mounted to a second camera mount, such as 118A, on the second vertical rod, such as 108A, and further excludes a third camera, such as 110B, mounted to a third camera mount, such as 118B, on the third vertical rod, such as 108B. Likewise, for example, the second camera 110A mounted to the second camera mount 118A on the second vertical rod 108A can be positioned wherein the second camera's lens field of view 120A extends between the first vertical rod 108C and the third vertical rod 108B, such that the second camera's lens field 120A of view excludes the first camera 110C mounted to the first camera mount 118C on the first vertical rod 108C, and further excludes the third camera 110B mounted to the third camera mount 118B on the third vertical rod 108B. Similarly, for example, the third camera 110B mounted to the third camera mount 118B on the third vertical rod 108B can be positioned wherein the third camera's lens field of view 120B extends between the first vertical rod 108C and the second vertical rod 108A, such that the third camera's lens field of view 120B excludes the first camera 110C mounted to the first camera mount 118C on the first vertical rod 108C, and further excludes the second camera 110A mounted to the second camera mount 118A on the second vertical rod 108A. In this manner, some or all of the cameras, such as 110A-110C, can be positioned to simultaneously capture images and/or video of the same production set or subject, such as 101, wherein the images and/or video lack or exclude the other respective cameras.

Also shown in the embodiment of FIGS. 1-3, an additional or fourth camera 122 can be mounted underneath the rod mounting plate 114 using an associated camera mount 124 or bracket to support the additional or fourth camera 122 in an adjacent or extended orientation away from and beneath the rod mounting plate 114. The additional or fourth camera 122 can capture an overhead perspective of a production set or subject 101 positioned underneath the motor 102, a rotatable plate 104, and/or set of horizontal rods 106A-106C, and within the set of vertical rods 108A-108C. In certain embodiments, some or all of the cameras 110A-110C, including the additional or fourth camera 122, can be positioned wherein the cameras 110A-110C, 122 can capture respective simultaneous images and/or video lacking the other respective cameras. For example, when the additional or fourth camera 122 is mounted to its respective camera mount 124 or bracket underneath the rod mounting plate 114, the additional or fourth camera 122 can be positioned wherein the additional or fourth camera's lens field of view 126 extends approximately between the three vertical rods 108A-108C, such that the fourth camera's lens field of view 126 excludes the other 3 cameras 110A-110C and camera mounts 118A-118C or brackets on the three vertical rods 108A-108C. In other words, a fourth camera 122 mounted to a fourth camera mount 124 beneath the rod mounting plate 114 can be positioned wherein the fourth camera's lens field of view 126 extends between a first vertical rod 108C, a second vertical rod 108A, and a third vertical rod 108B, such that the fourth camera's lens field of view 126 excludes a first camera 110C mounted to a first camera mount 118C on a first vertical rod 108C, a second camera 110A mounted to a second camera mount 118A on a second vertical rod 108A, and a third camera 110B mounted to a third camera mount 118B on a third vertical rod 108B. In this manner, some or all of the cameras 110A-110C, 122 can be positioned to simultaneously capture images and/or video of the same production set or subject 101, wherein the images and/or video lack or exclude the other respective cameras. In other embodiments, fewer or greater numbers of and/or different types of cameras can be used, such as fewer than 3 cameras, more than 4 cameras, still cameras, video cameras, and/or a mixture of still and video cameras.

Further shown in the embodiment of FIGS. 1-3, a set of lighting 128 can be mounted underneath the rod mounting plate 114 and, in certain instances, to the associated camera mount 124 or bracket. The lighting 128 can be, for example, a series of 3 LED lights operable to illuminate an area below the rod mounting plate 114 and towards each vertical rod 108A-108C and associated camera 110A-110C mounted to a respective camera mount 118A-118C or bracket on each vertical rod 108A-108C. In other embodiments, other types or numbers of lighting can be mounted to the system or apparatus, such as along one or more horizontal rods 106A-106C and/or vertical rods 108A-108C, or at or adjacent to one or more camera mounts 118A-118C or brackets.

In other embodiments, different configurations of horizontal rods and/or vertical rods can be used in conjunction with a rotatable plate 104 and/or rod mounting plate 114. In certain embodiments, 3 or more cameras may be suspended from one or more telescoping rods extending from a central point above a production set or subject 101.

Figure 4:
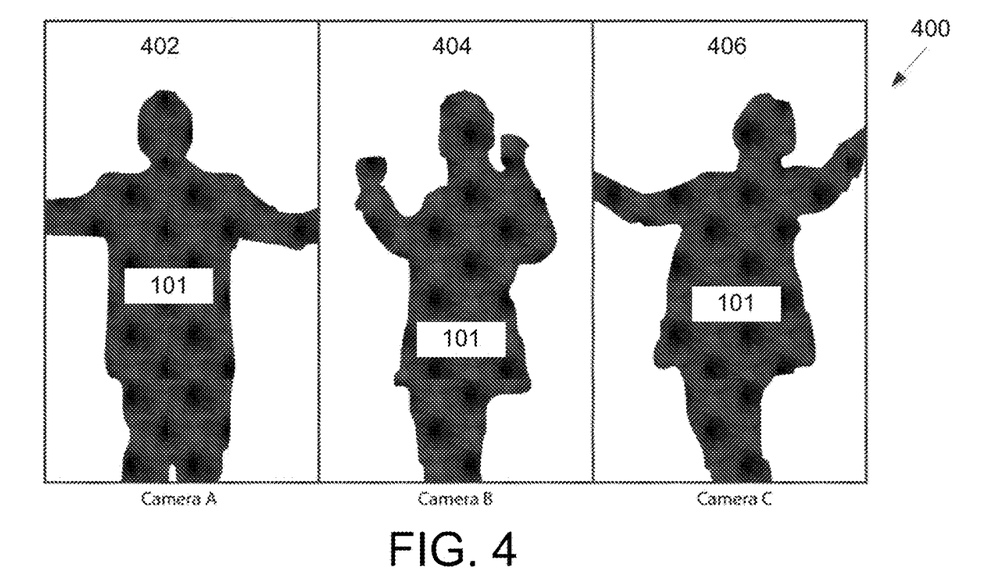
FIG. 4 illustrates a series of images captured by at least one embodiment of the disclosure.
Figure 5:
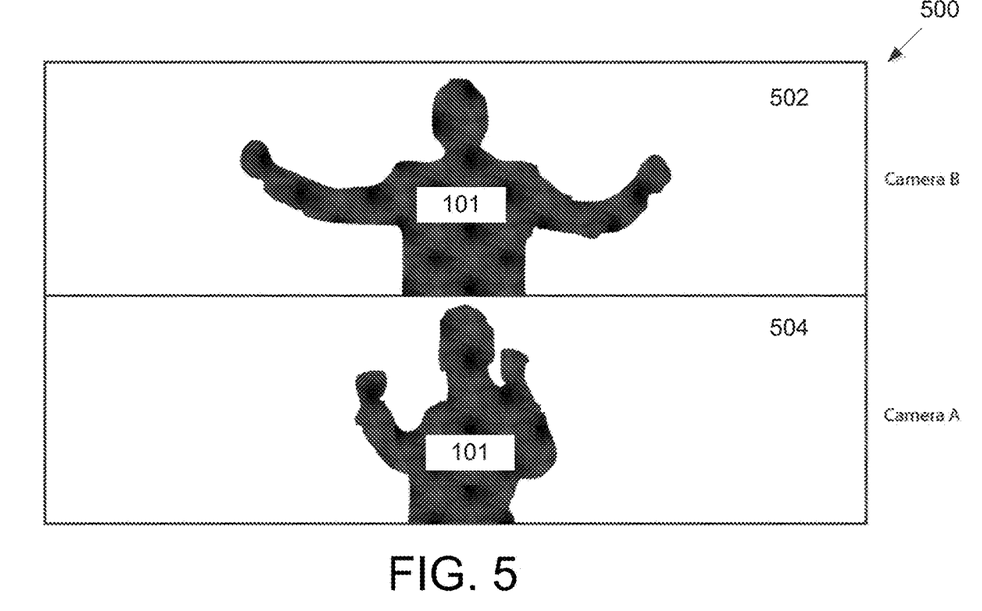
FIG. 5 illustrates another series of images captured by at least one embodiment of the disclosure.

FIGS. 4 and 5 illustrate examples of various series of images captured by at least one embodiment of the disclosure. In certain instances, the simultaneously captured images and/or video captured by the system or apparatus 100 described above and shown in FIGS. 1-3 can be arranged in a vertical split screen arrangement 400, similar to that shown in FIG. 4, or in a horizontal split screen arrangement 500, similar to that shown in FIG. 5. The series of three images 402, 404, 406 and/or video shown in the vertical split screen arrangement 400 of FIG. 4 illustrate three different perspectives of a single subject, such as 101, wherein each of the perspectives was simultaneously captured by a different camera 110A-110C directed towards the subject 101. Similarly, the series of two images 502, 504 and/or video shown in the horizontal split screen 500 arrangement of FIG. 5 illustrate two different perspectives of a single subject, such as 101, wherein each of the perspectives was simultaneously captured by a different camera, such as 110A and 110B, directed towards the subject 101. In any instance, during viewing and/or playback of images and/or video in both the vertical 400 or horizontal split screen arrangement 500, the images and/or video lacks or excludes the other cameras, such as 110C, from the images and/or video shown. The combination of the captured images and/or video can create an interesting visual or cinematic effect.

Figure 6:
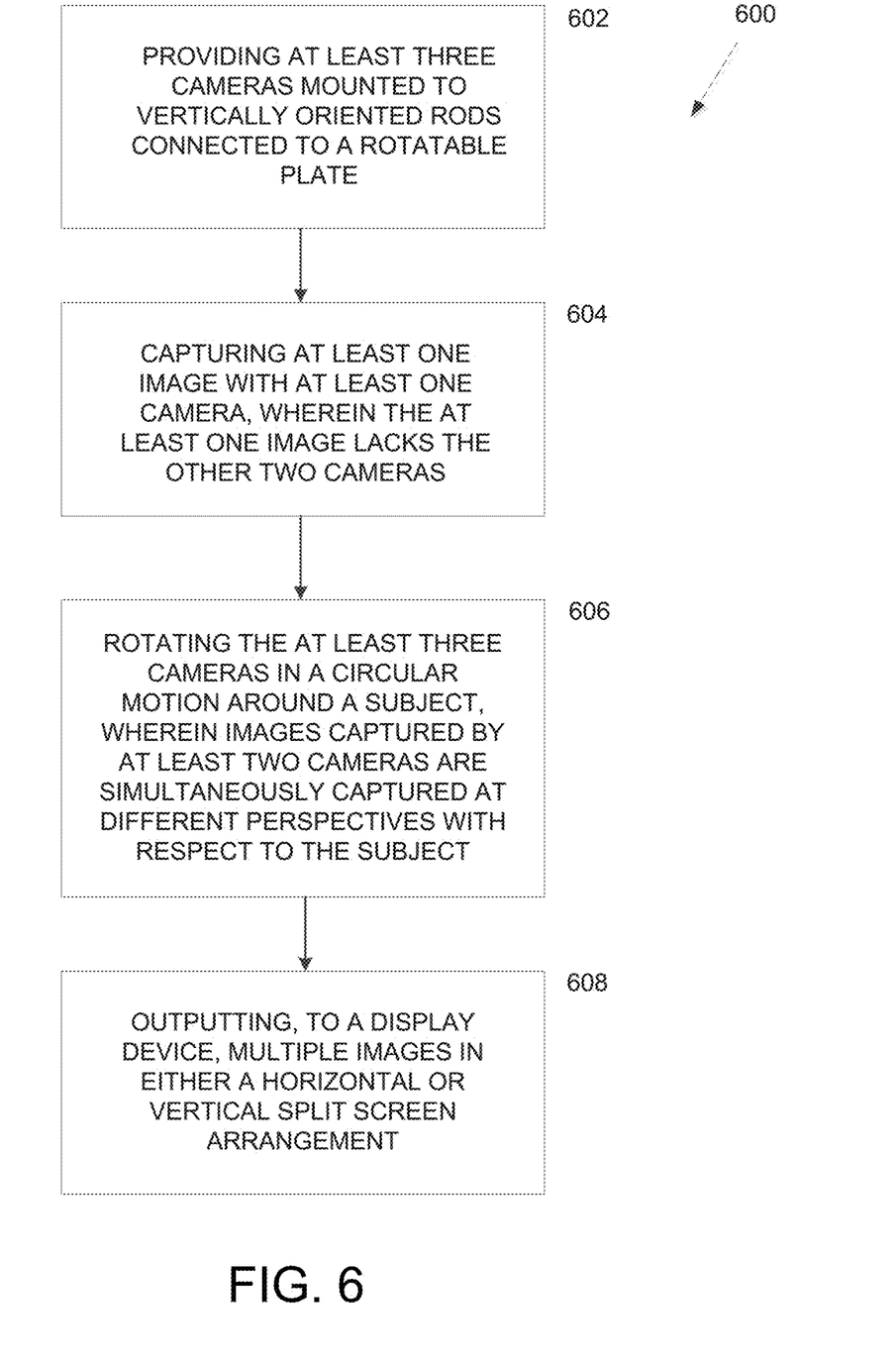
FIG. 6 illustrates an example method according to an embodiment of the disclosure.
Figure 7:
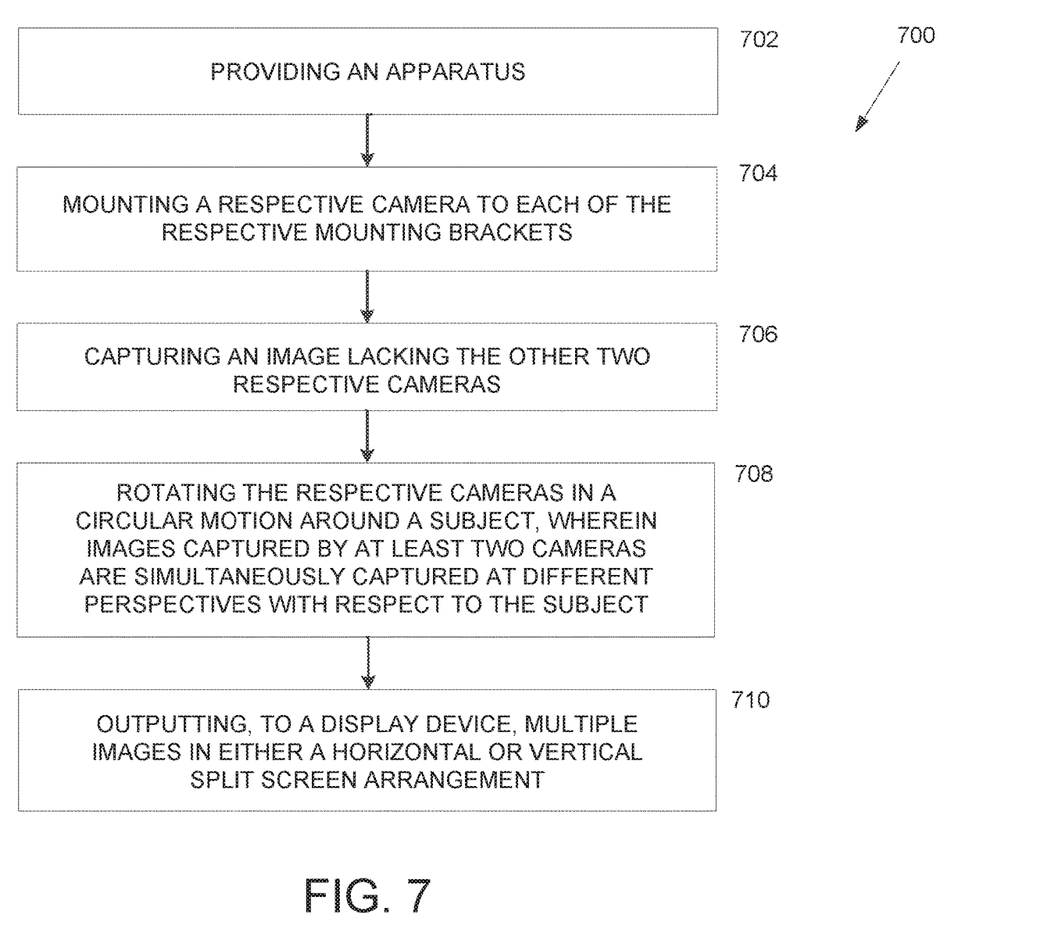
FIG. 7 illustrates another example method according to an embodiment of the disclosure.

FIGS. 6 and 7 illustrate flow charts of example processes according to certain embodiments of the disclosure. The processes can be performed by or otherwise implemented by the system or apparatus shown in, for example, FIGS. 1-3. As shown in FIG. 6, in one embodiment, an associated process 600 can begin at block 602 with providing at least three cameras mounted to vertically oriented rods connected to a rotatable plate. In a following operation, the process 600 can include capturing at least one image with at least one camera, wherein the at least one image lacks the other two cameras, as illustrated in block 604. In a subsequent operation, the process 600 can include rotating the at least three cameras in a circular motion around a subject, wherein images captured by at least two cameras are simultaneously captured at different perspectives with respect to the subject, as illustrated in block 606. In a following operation, the process 600 can include outputting, to a display device, multiple images in either a horizontal or vertical split screen arrangement, as illustrated in block 608.

In another embodiment, another associated process 700 can begin at block 702 with providing an apparatus including a rotatable plate; a first horizontal rod mounted to the rotatable plate, the first horizontal rod having a first end and a second end; a second horizontal rod mounted to the rotatable plate, the second horizontal rod having a first end and a second end; a third horizontal rod mounted to the rotatable plate, the third horizontal rod having a first end and a second end; a first vertical rod mounted to the first horizontal rod, the first vertical rod having a first end and a second end; a second vertical rod mounted to the second horizontal rod, the first vertical rod having a first end and a second end; a third vertical rod mounted to the third horizontal rod, the third vertical rod having a first end and a second end; and a respective mounting bracket on each of the first vertical rod, second vertical rod, and third vertical rod. In a subsequent operation shown by block 704, the process 700 can include mounting a respective camera to each of the respective mounting brackets. In a subsequent operation shown by block 706, the process 700 can include capturing an image lacking the other two respective cameras. In a following operation shown by block 708, the process 700 can include rotating the respective cameras in a circular motion around a subject, wherein images captured by at least two cameras are simultaneously captured at different perspectives with respect to the subject. In a subsequent operation shown by block 710, the process 700 can include outputting, to a display device, multiple images in either a horizontal or vertical split screen arrangement.

Other similar embodiments of processes performed by or implemented by the system or apparatus 100 of FIGS. 1-3 can have fewer or greater numbers of operations.

Figure 8:
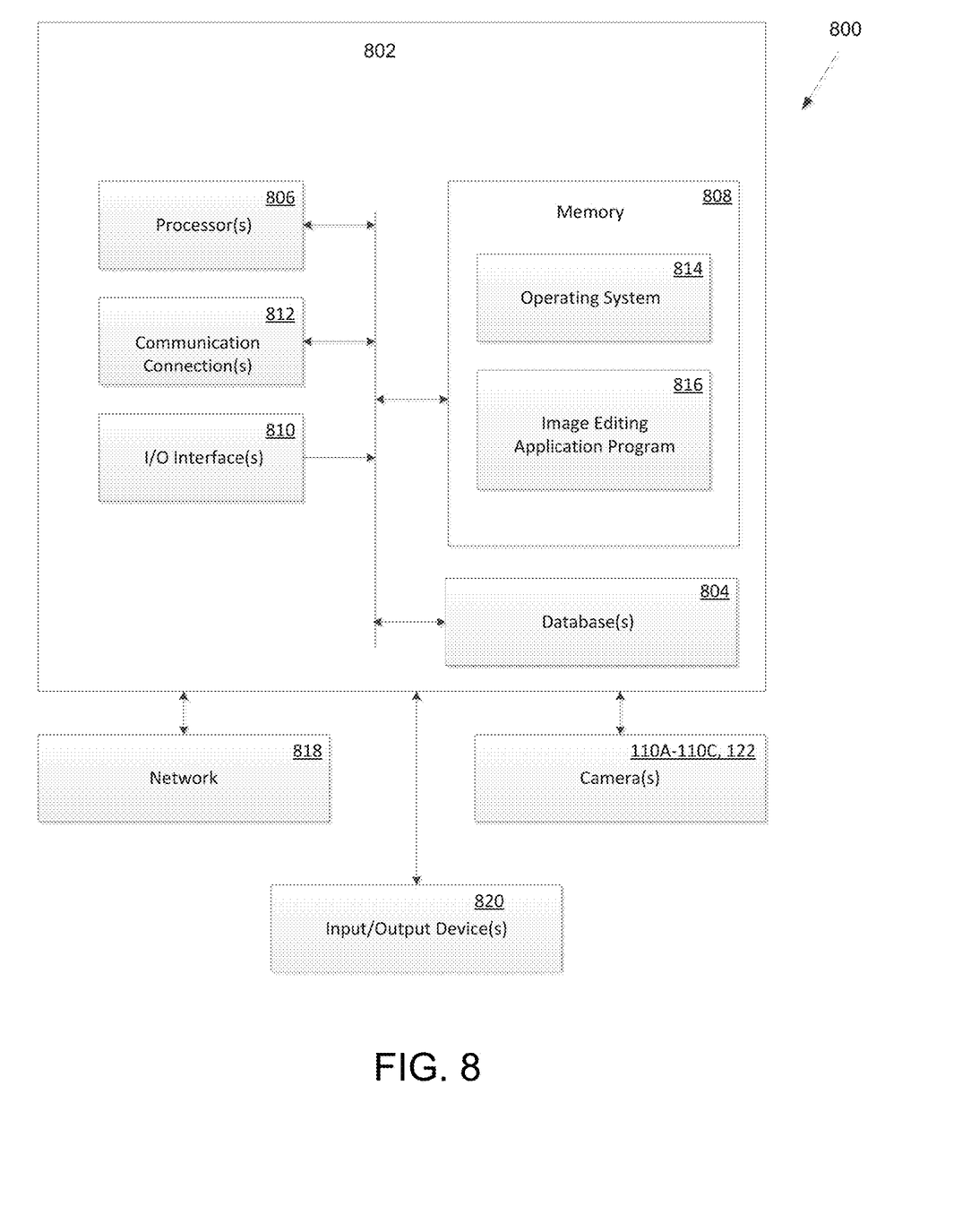
FIG. 8 illustrates an example processing and output architecture according to an embodiment of the disclosure.

FIG. 8 illustrates a block diagram of an example processing and output architecture or system 800 that may be utilized in accordance with various embodiments of the disclosure to facilitate the systems, methods, and apparatus for capturing multiple views of a subject. The architecture or system 800 may include one or more computers and client devices in communication with one or more cameras, such as those described above and shown in FIGS. 1-3 as 110A-110C, 122. In certain embodiments, communications between the computers, client devices, and/or cameras as 110A-110C, 122 may be facilitated via one or more suitable networks 818, such as the Internet, etc. In other embodiments, communications between the computers, client devices, and/or cameras as 110A-110C, 122 may be facilitated by wired and/or wireless communications.

As shown in FIG. 8, one or more computers and/or client devices 802 may obtain and store information associated with captured images from the one or more cameras 110A-110C, 122. For example, captured images may be stored in one or more databases 804. Each database 804 may contain data files for the captured images. As desired, captured image information may be obtained from a wide variety of suitable sources, such as the client devices 802, any number of captured image records and/or from any other suitable data sources.

Any number of computers and/or client devices 802 may be provided. A computer and/or client device 802 may include any number of processor-driven devices, including, but not limited to, a server computer, a personal computer, one or more networked computing devices, an application-specific circuit, a minicomputer, a microcontroller, and/or any other processor-based device and/or combination of devices. A service provider computer may utilize one or more processors to execute computer-readable instructions that facilitate the general operation of the computer and/or provisions of the image processing module.

In addition to having one or more processors 806, the computer and/or client device 802 may further include one or more memory devices (generally referred to as memory) 808, one or more input/output ("I/O") interface(s) 810, and/or one or more communication connections 812. The communication connections 812 may interface with a database, which may contain one or more data files, which may include captured image data. For example, the data files may include information associated with one or more client devices, captured image information associated with one or more cameras 110A-110C, 122, rules and/or parameters, etc.

The memory 808 may be any computer-readable medium, coupled to the one or more processors 806, such as random access memory ("RAM"), read-only memory ("ROM"), and/or removable storage devices. The memory may store one or more program modules utilized by the computer, such as an operating system (OS) 814. The one or more program modules may include an image processing module, such as an image editing application program 816.

Certain embodiments may be provided as a computer program product including a non-transitory machine-readable storage medium having stored thereon instructions (in compressed or uncompressed form) that may be used to program a computer (or other electronic device) to perform processes or methods described herein. For example, certain embodiments may be provided as a computer program product or group of products that may be executed by the computers or other suitable computing systems. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, distribution of software may be an Internet download.

With reference to the contents of the memory 808, the data files may include any suitable data that facilitates the operation of the computer and/or interaction of the computer with one or more other components of the system.

The OS 814 may be any suitable module that facilitates the general operation of the computer, as well as the execution of other program modules. The one or more program modules, such as the image processing module or image editing application program 816, may include one or more suitable software modules and/or applications. Additionally, the image processing module or image editing application program 816 may be configured to receive a wide variety of user input from a client device and to process the received user input to manipulate one or more captured images, such as arranging the images into a vertical split screen 400 or horizontal split screen arrangement 500, similar to those shown in FIGS. 4 and 5.

The client devices 802 may include any computing device such as a tablet, smart phone, wearable computer, or personal computer. The client devices 802 may include one or more processors 806. The one or more processors 806 may be implemented as appropriate in hardware, software, firmware, or combinations thereof. Software or firmware implementations of the one or more processors 806 may include computer-readable or machine-readable instructions written in any suitable programming language to perform the various functions described. The client devices 802, in addition to having one or more processors, may further include one or more memory devices (generally referred to as memory) 808, one or more input/output ("I/O") interface(s) 810, and/or one or more communication connections 812. The communications connections 812 may interface with the network 818 to transmit information for the captured images.

Similar to memory above, the memory 808 may be any computer-readable medium, coupled to the one or more processors of the client devices, such as random access memory ("RAM"), read-only memory ("ROM"), and/or removable storage devices. The memory 808 may store one or more program modules utilized by the client devices 802, such as an operating system (OS) 814. The one or more program modules may include an image processing module, such as an image editing application program 816.

The one or more I/O interfaces 810 may facilitate communication between the computers and one or more input/output devices 820. For example, one or more input/output devices 820 such as user interface devices can include, but are not limited to, a display, a keypad, a keyboard, a touch screen display, a microphone, a speaker, a mouse, or any other similar device that can facilitate user interaction. The one or more network and/or communication connections 812 may facilitate connection of the computers to any number of suitable networks, for example, the one or more network(s). In this regard, the computers may receive and/or communicate information to other components of the system.

Any number of client devices 802 may be included in the system. A client device 802 may be configured to access one or more cameras hosted by or in communication with the computers in order to review and/or manipulate captured image information. In certain embodiments, a client device 802 may include similar components as those discussed above for the computers. For example, a client device 802 may include any number of processors, memories, I/O interfaces, and/or network/communication interfaces.

A wide variety of suitable networks (which may be the same or separate networks) and/or communication channels may be utilized to facilitate communications between the one or more cameras, client devices, the computers and/or other components of the system. These networks may include, but are not limited to, one or more telecommunication networks, cellular networks, wide area networks (e.g., the Internet), and/or local area networks. Various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The processing and output architecture or system 800 described is provided by way of example only. Numerous other operating environments, system architectures, and device configurations are possible. Other architecture and system embodiments can include fewer or greater numbers of components and may incorporate some or all of the functionality described with respect to the architecture or system components shown. Accordingly, embodiments of the disclosure should not be construed as being limited to any particular operating environment, system architecture, or device configuration.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising:
   a rotatable plate attached to a rod mounting plate;
   a first horizontal rod mounted to the rod mounting plate, the first horizontal rod having a first end, a second end, and a middle section;
   a second horizontal rod mounted to the rod mounting plate, the second horizontal rod having a first end and a second end;
   a third horizontal rod mounted to the rod mounting plate, the third horizontal rod having a first end and a second end;
   a first vertical rod mounted to the first horizontal rod, the first vertical rod having a first end and a second end;
   a second vertical rod mounted to the second horizontal rod, the second vertical rod having a first end and a second end;

a third vertical rod mounted to the third horizontal rod, the third vertical rod having a first end and a second end; and a respective mounting bracket on each of the first vertical rod, second vertical rod, and third vertical rod;

wherein a first camera is mounted to a first mounting bracket, a second camera is mounted to a second mounting bracket, and a third camera is mounted to a third mounting bracket, wherein each respective camera comprises a field of view, and the each respective camera captures a different perspective of a subject within the respective field of view of the each respective camera;

wherein the each respective camera captures an image lacking the other respective cameras due to the other respective cameras being outside of the field of view of the each respective camera and regardless of location of the subject positioned within the field of view of the each respective camera;

a memory operable to store one or more computer-executable instructions, the one or more computer-executable instructions operable to:

receive each image from the each respective camera;

facilitate user control to organize images in either a horizontal or vertical split screen arrangement; and facilitate control of the each respective camera in a circular rotation around the subject, wherein each image is simultaneously captured at different perspectives with respect to the subject; and a computer processor operable to store captured images and to output the captured images, to a display device, in the horizontal or vertical split screen arrangement;

wherein each set of multiple images is simultaneously captured, and wherein the each image from the each respective camera lacks the other respective cameras.

2. The system of claim 1, further comprising:
a variable motor operable to rotate the rotatable plate in the circular motion;
one or more lights operable to illuminate an area adjacent to a respective camera; and
a camera mounted beneath the rotatable plate.

3. The system of claim 1, wherein each of the horizontal rods and vertical rods is adjustable in length, and an angle between each horizontal rod and corresponding vertical rod can be manually or automatically adjusted between 0 and 180 degrees.

4. The system of claim 1, wherein the one or more computer-executable instructions are further operable to:
output, to the display device, multiple images from the some or all of the first, second, and third cameras in either the horizontal or vertical split screen arrangement on the display device.

5. A method comprising:
providing three cameras mounted to respective vertically oriented rods connected to respective horizontal rods connected to a rod mounting plate attached to a rotatable plate;
capturing at least one image with each respective camera, each of the three cameras comprising a respective field of view, each of the three cameras capturing a different perspective of a subject within the respective field of view of each of the three cameras, wherein the at least one image from each respective camera lacks the other two cameras due to the other two cameras being outside of the respective field of view of each respective camera and regardless of location of the subject positioned within the respective field of view of the each respective image capturing camera;
receiving images from the each respective camera;
facilitating user control to organize the images in either a horizontal or vertical split screen arrangement;
facilitating control of the each respective camera in a circular rotation around the subject, wherein the images are simultaneously captured at different perspectives with respect to the subject; and
outputting, to a display device, multiple images in the either a horizontal or vertical split screen arrangement, wherein each set of the multiple images is simultaneously captured, and wherein each image from the each respective an image capturing camera lacks the other two cameras.

6. The method of claim 5, further comprising:
rotating the three cameras in a circular motion around a subject, wherein the images captured by at least two cameras are simultaneously captured at different perspectives with respect to the subject.

7. A method comprising:
providing a rotatable plate attached to a rod mounting plate;
providing a first horizontal rod mounted to the rod mounting plate, the first horizontal rod having a first end, a second end, and a middle section;
providing a second horizontal rod mounted to the rod mounting plate, the second horizontal rod having a first end and a second end;
providing a third horizontal rod mounted to the rod mounting plate, the third horizontal rod having a first end and a second end;
providing a first vertical rod mounted to the first horizontal rod, the first vertical rod having a first end and a second end;
providing a second vertical rod mounted to the second horizontal rod, the second vertical rod having a first end and a second end;
providing a third vertical rod mounted to the third horizontal rod, the third vertical rod having a first end and a second end;
providing a respective mounting bracket on each of the first vertical rod, second vertical rod, and third vertical rod;
mounting a respective camera to each of the respective mounting brackets;
capturing images with each respective camera with a field of view, the each respective camera capturing an image with a different perspective of a subject within a respective field of view of the each respective camera, the image from the each respective camera lacking the other respective cameras due to the other respective cameras being outside of the field of view of the each respective camera and regardless of location of the subject positioned within the field of view of the each respective camera;
receiving the images from the each respective camera;
facilitating user control to organize the images in either a horizontal or vertical split screen arrangement;
facilitating control of the each respective camera in a circular rotation around the subject wherein the images from the each respective camera are simultaneously captured at different perspectives with respect to the subject; and
outputting, to a display device, multiple images in either the horizontal or vertical split screen arrangement, wherein each set of the multiple images is simultaneously captured, and wherein each image from the each respective camera lacks the other respective cameras.

8. The method of claim 7, further comprising:

rotating the respective cameras in the circular motion around the subject, wherein the images captured by at least two cameras are simultaneously captured at different perspectives with respect to the subject.

* * * * *